(No Model.)  2 Sheets—Sheet 1.
M. LOREE.
TRUCK.
No. 376,389. Patented Jan. 10, 1888.
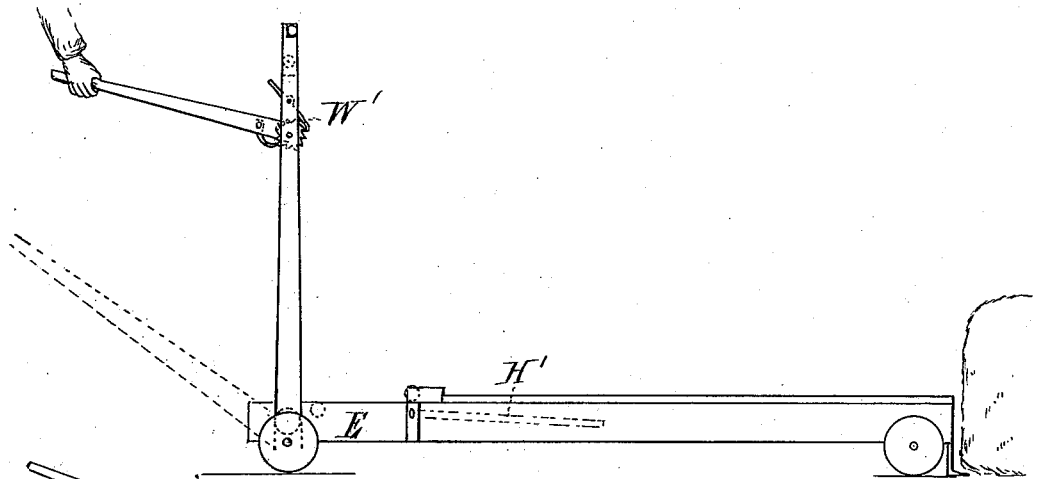
Fig. 1
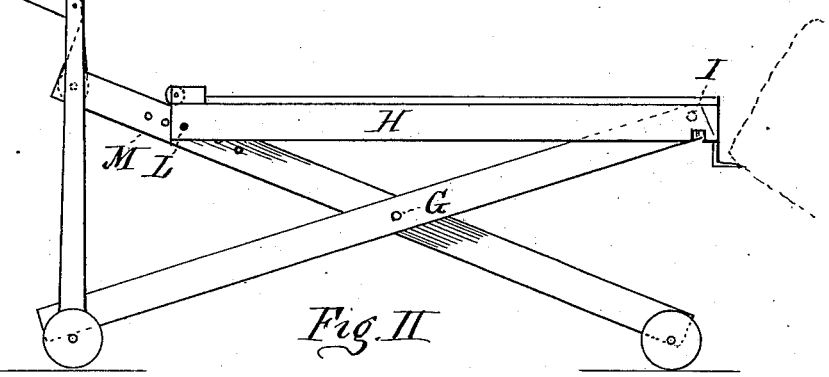
Fig. II
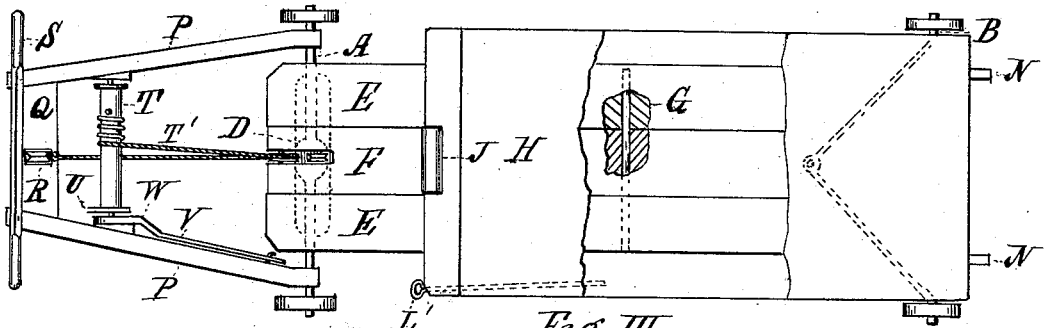
Fig. III
WITNESSES: Robert Kirk, Robt. S. Miller
INVENTOR: Manfred Loree
By  Attorney.

(No Model.) M. LOREE. 2 Sheets—Sheet 2.
TRUCK.
No. 376,389. Patented Jan. 10, 1888.
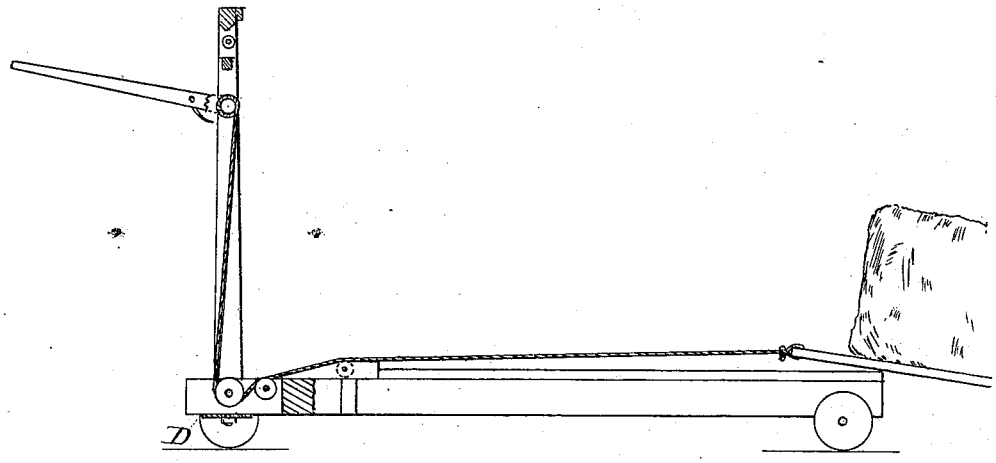
Fig. IV.
WITNESSES:
Robert Kirk.
Robt. S. Millar
INVENTOR:
Manfred Loree
By [signature]
Attorney.

UNITED STATES PATENT OFFICE.

MANFRED LOREE, OF MIAMISBURG, OHIO.

TRUCK.

SPECIFICATION forming part of Letters Patent No. 376,389, dated January 10, 1888.

Application filed July 16, 1887. Serial No. 244,494. (No model.)

*To all whom it may concern:*

Be it known that I, MANFRED LOREE, of Miamisburg, in the county of Montgomery and State of Ohio, have invented a new and useful Improvement in Elevating-Trucks, which improvement is fully set forth in the following specification and accompanying drawings, in which—

Figure 1 is a side view of my elevating-truck in position preparatory to elevating bed of the same. Fig. 2 is a side view showing the bed elevated; Fig. 3, a top or plan view, and Fig. 4 a side view showing manner of using the truck for drawing heavy objects on the bed by means of the windlass.

The object of my invention is to provide an elevating-truck and to arrange a windlass in connection therewith, so that heavy objects can be loaded and elevated without requiring more than a single operator; and it consists of two axles, each having a pair of low wheels, the front axle of which carries centrally a fifth-wheel, on which are mounted and secured the forward ends of two beams a short distance from each other, the rear axle of which has centrally the rear end of another beam attached to it and held firmly in position by means of a pair of hounds. The single beam attached to the rear axle rests between the two beams attached to the fifth-wheel of the front axle, and midway between the ends of these beams is a horizontal pin, which hinges said beams together. A bed is mounted on these beams, the rear end of which is hinged to the rear ends of the beams which project back from the front axle, the forward end of said bed being equipped with rollers which roll on the two beams. The handle of the truck has a windlass and a pawl and lever, the rope from the windlass being attached to the forward or free end of the beam which projects forward from the rear axle, so that when the windlass is turned the bed will be raised to any desired position, all of which will now be fully set forth in detail.

In the accompanying drawings, A represents the forward and B the rear axle of the truck, having small wheels C. The front axle, A, has centrally a fifth-wheel, D, to which are attached, side by side, but separated from each other, two beams, E E, the rear ends of which rest on the rear axle, but are not attached thereto.

F is a beam attached at its rear end to the center of the rear axle, B. This beam lies between the beams E, and its forward end rests on the front axle, but is not attached thereto. Midway between the ends of these beams is a horizontal pin or pivot, G, which holds the two axles and the beams together.

H is a bed somewhat shorter than the distance between the axles, the rear end of which is hinged to the rear ends of the beams E E at I. The front end of this bed has a roller, J, so located that it rests and rolls on the upper surface of the beam F.

L represents a horizontal hole through the forward end of the bed H, and M is a series of holes in the beam F corresponding with the hole L, so that when the bed H is elevated a pin can be placed therein to hold the bed in position at any height. The rear end of the bed has one or more projecting prongs or fingers, N, which are designed to be placed under any heavy object preparatory to raising the same by means of the windlass, which will now be explained.

The handle for operating the truck is composed of the two bars P P, the rear ends of which are hinged to the front axle. The forward ends are inclined toward each other and are connected by means of a bar, Q, which is centrally provided with a grooved pulley, R. A hand-bar, S, is also attached to the forward ends of these handle-bars P. A short distance below the cross-bar Q is a roller or windlass, T, on one end of which is a ratchet-wheel, U, and a lever, V, in close proximity carries a pawl, W, which engages with the ratchet-wheel. On the side of the bar P and engaging with the ratchet-wheel U is a retention-pawl, W', which holds the roller or windlass in position as the lever turns the roller and raises the truck-bed.

The rope T', which is wrapped around the windlass, may extend down to the forward end of the beam F directly, or it may first pass over the grooved pulley R and then down to the beam F. By having the rope pass over the pulley R it is obvious that the truck-bed can be raised to a greater elevation than if the rope passes merely from the windlass immediately to the beam F. If desired, the rope may be placed around one or more pulleys, F', in the forward end of the beam F, and extend thence up to the cross-piece Q, in order to gain compound leverage, as shown in Fig. 3; or the rope may be passed around the pulley F' and the end extended back and secured to any object that is desired to be drawn on the truck, as shown in Fig. 4.

In order to provide a suitable place to hold the retaining-pin L', which is placed in the holes L, I bore a longitudinal hole, H', in the bed-beam of sufficient size to receive the pin, as shown in Fig. 1.

What I claim as new is—

1. In an elevating-truck, the forward axle having centrally a fifth-wheel, to which are attached the forward ends of two beams, and a rear axle having centrally attached thereto the rear end of a similar beam, the latter of which projects forward and rests between the two beams of the forward axle, said beams being centrally hinged together and carrying a bed, substantially as herein set forth.

2. In an elevating-truck, the combination of beams secured alternately at their front and rear ends to the forward and rear axles and centrally hinged together, and mounted thereon a bed hinged at its rear end to the rearwardly-projecting beams and provided at its forward end with a roller or friction-wheel, J, said beams having a series of holes, which correspond with each other, in the sides, and a pin, L', substantially as herein set forth.

3. In an elevating-truck, the combination of beams secured alternately at their front and rear ends to the front and rear axles, as shown, and mounted thereon the bed H, with the handles or arms P, carrying the windlass T and rope T', substantially as herein set forth.

In testimony that I claim the foregoing I have hereunto set my hand, this 28th day of March, 1887, in the presence of witnesses.

MANFRED LOREE.

Witnesses:
AMOS K. CLAY,
DANIEL C. WEIDNER.